April 23, 1946.    W. C. JOHNSON    2,399,122
ADJUSTABLE MOUNTING FOR RING GEARS
Filed July 15, 1944    2 Sheets-Sheet 1
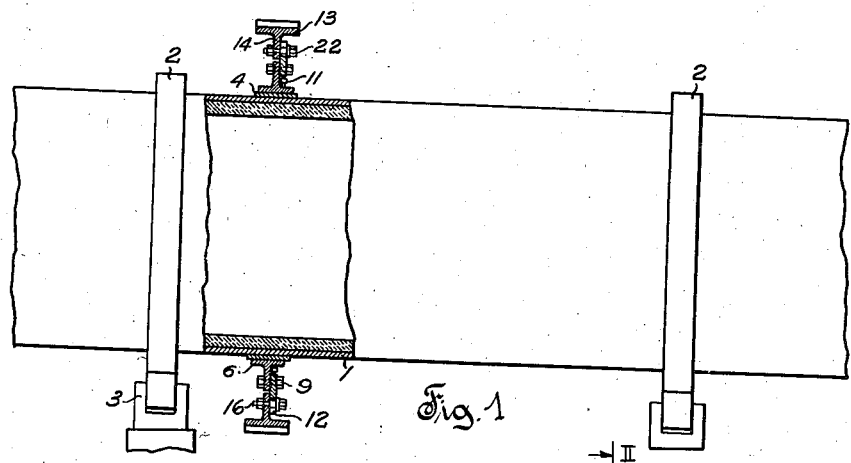
Fig. 1
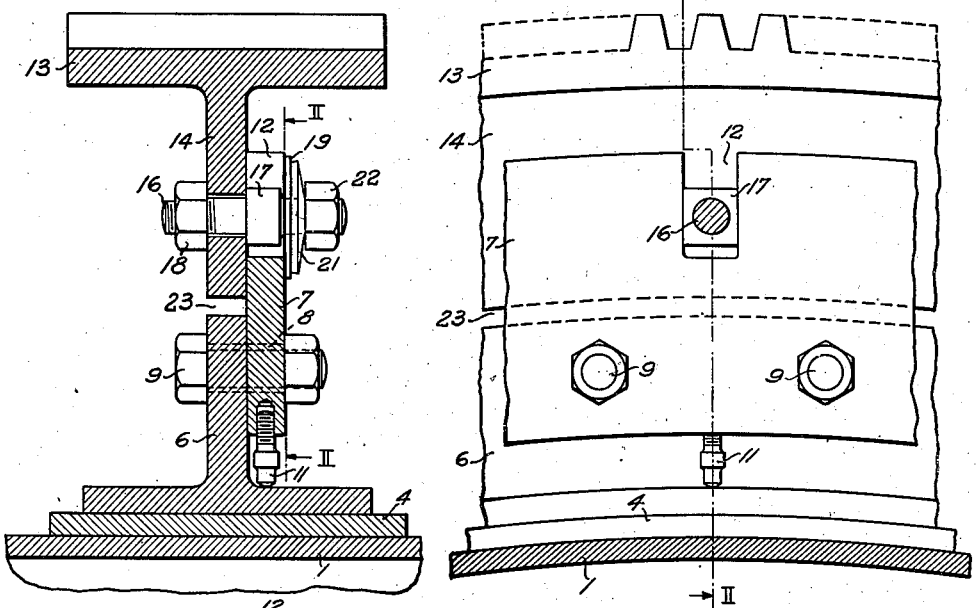
Fig. 2
Fig. 3
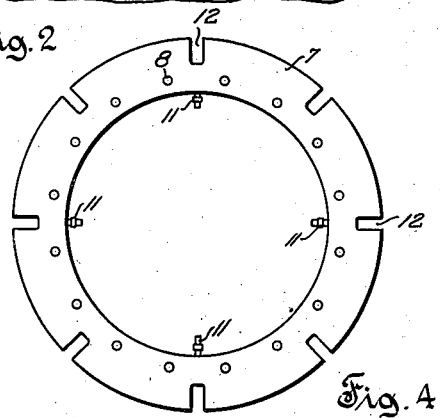
Fig. 4
Inventor
William C. Johnson
by William [signature]
Attorney April 23, 1946.  W. C. JOHNSON  2,399,122
ADJUSTABLE MOUNTING FOR RING GEARS
Filed July 15, 1944  2 Sheets-Sheet 2

Inventor
William C. Johnson
by William S. Yates
Attorney

Patented Apr. 23, 1946

2,399,122

UNITED STATES PATENT OFFICE 2,399,122

ADJUSTABLE MOUNTING FOR RING GEARS

William C. Johnson, Wauwatosa, Wis., assignor to Allis-Chalmers Manufacturing Company, Milwaukee, Wis., a corporation of Delaware Application July 15, 1944, Serial No. 545,141

7 Claims. (Cl. 74—446)

This invention relates to improvements in gear structure, particularly in means for mounting ring gears on the drums of ball mills, kilns and other machines where the driven element is large in diameter and subject to high operating temperatures.

It is of great importance to maintain toothed gear rims coaxial with the axis of rotation in order that wear due to misalignment and improper meshing may be avoided.

It is also of great importance to protect a ring gear from severe circumferential stresses which may break the rim.

It has been customary prior to this invention to mount ring gears by bolting them on flanges directly attached to the driven mill or kiln drum. This results in a structure which so long as the drum shell remains coaxial with the bearing journals will provide a coaxial gear held in concentricity by friction. However, if there is a change in the bearing journal the ring gear will no longer remain coaxial but will be eccentric to the axis of rotation. Means must therefore be provided to adjust the gear to coaxiality with the bearing journals. Furthermore the drum is subject to high temperature operating conditions which cause it to expand. The ring gear, not being a part of the drum and equally heated at all times, is subjected to severe strains due to the thermal expansion or contraction of the drum relative thereto, and has often failed in service under these strains.

It is an object of the present invention to provide a gear mounting in which a rigid ring gear may be readily adjusted to concentricity with the bearing journal.

It is a further object of this invention to provide a mounting for a rigid ring gear on a relatively expanding and contracting element which will provide for substantially free thermal expansion of the mounting member relative to the ring gear while preserving a coaxial driving relation of the gear relative to the bearing journal, thus relieving the ring gear from strains due to thermal expansion of the mounting member.

More particularly this invention relates to a structure for mounting gears in which a device is provided for attaching a rigid ring gear in coaxial driving relation with a driven element, the device providing for substantially free radial expansion and contraction of the driven element relative to the ring gear.

The invention having the above and other objects which may appear herein may be carried into practical effect as hereinafter fully described with reference to the accompanying drawings in which:

Fig. 1 is a fragmentary view of a rotary kiln or mill shell shown partially in longitudinal section through a driving gear according to the invention;

Fig. 2 is an enlarged fragmentary section of the upper portion of the driving gear of Fig. 1, taken on the line II—II of Fig. 3;

Fig. 3 is a fragmentary end view of a portion of the driving gear of Fig. 1, shown partly in section on the line III—III of Fig. 2;

Fig. 4 is a detail end view of a driving ring according to the embodiment of the invention shown in Fig. 1;

Similar reference characters refer to similar parts throughout the several views of the drawings.

Figure 5:
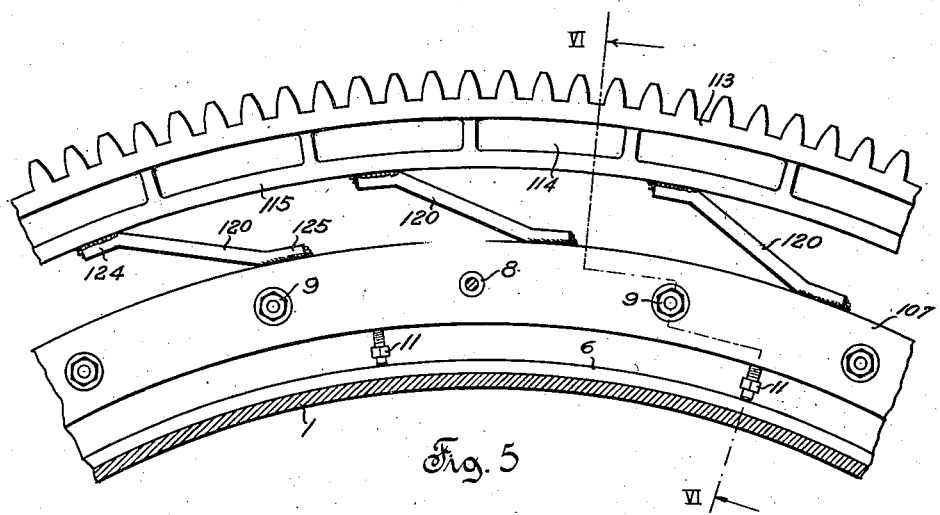
Fig. 5 is a fragmentary cross-section through a drum shell showing a modified form of ring gear mounting according to the invention.

In Fig. 1 of the drawings by way of example, a preferred embodiment of the driving gear of this invention is shown in connection with a kiln or mill having a drum or shell 1 equipped, for example, with riding rings or tires 2 forming a bearing journal supported on supporting bearings 3. In place of tires 2 and bearings 3 as shown, the drum obviously may be supported on any other suitable known type of bearing (not shown) providing for rotation of the drum on a fixed longitudinal axis.

The drum 1 may or may not be provided with a reinforcing pad 4, and a driving flange 6 may be mounted on such pad 4 or directly on the drum 1 in driving relation thereto. In order to provide for adjustment of the driving gear to concentricity with the drum or bearing axis, an intermediate driving ring 7 provided with enlarged bolt holes 8 may be secured to the flange 6 by bolts 9 in an obvious manner. For adjustment, a plurality of radially extending adjusting screws 11 may be threadedly engaged in radial holes in the inner periphery of ring 7. The ends of screws 11 may bear on the surface of flange 6 as shown in Figs. 1, 2 and 3.

In the outer edge of ring 7 there may be cut a series of similar radially extending slots 12 equiangularly spaced about the circumference of the ring, each slot 12 having parallel sides as clearly shown in Figs. 3 and 4. The number of slots may be any integral number greater than 2, that is, there must be at least three slots.

A toothed ring gear 13 of rigid circular form may have an annular web 14 extending radially inwardly and provided with extensions, for example, bolts 16, having a square shank or intermediate block 17, may be secured to web 14 in a circle concentric with the pitch circle, being held rigidly in place by nuts 18. The lateral extensions formed by bolt shanks 17 are arranged in number and location to correspond with slots 12 in ring 7, and have a tangential dimension equal to the width of slots 12, and fit slidably in slots 12. Slots 12 being truly radial to ring 7 and shanks or projections 17 being arranged concentric to the pitch circle of ring gear 13, driving ring 7 and ring gear 13 will be coaxially related regardless of thermal expansion of ring gear 13 relative to annular driving ring 7 or vice versa. The ring gear 13 may be held in axially fixed coaxial driving relation with driving ring 7 as by plain washer 19 and Belleville spring washer 21 against which a nut 22 on bolt 16 may be tightened to a desired degree. The pressure exerted between flange 14 and ring 7 will depend on the spring tension on Belleville washer 21 and which will be chosen to create a limited frictional holding force which will limit the amount of radial strain which may be transferred between ring 7 and flange 14 due to relative thermal expansion or contraction, to a degree which will be safe, permitting radial motion between flange 14 and ring 7 to occur under a fairly low strain. There will, due to this arrangement, be substantial freedom of relative expansion and contraction of ring gear 13 and ring 7, within practical limits, without danger of rupture of ring gear 13 due to thermal expansion of ring 7 and drum 1 which may become heated to a much higher temperature in service than ring gear 13. This relative expansion and contraction may occur without disturbing the coaxial relationship of ring gear 13 to the bearing journals represented by riding rings or tires 2.

A gap 23 is left between flange 14 and flange 6 to provide for relative centering adjustment.

Destruction in service of the coaxial relation between bearing journals 2 and ring gear 13 may be compensated for by adjustment of ring 7 with relation to drum 1 by loosening bolts 9 and alining ring 7 with journals 2 by adjustment of screws 11.

Obviously slots 12 might be formed in flange 14 and bolts 16 secured in ring 7, such an arrangement being a full mechanical equivalent (not shown) to the structure of Figs. 1–4.

Figure 6:
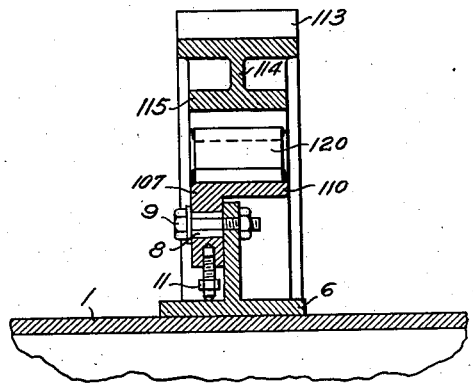
Fig. 6 is a section on the line VI—VI of Fig. 5.

A second embodiment of this invention is illustrated in Figs. 5 and 6 of the drawings in which drum 1 is similar to that shown in Fig. 1. Driving flange 6 is shown secured directly to drum 1. Intermediate or driving ring 107 is adjustably mounted by bolts 9 in enlarged holes 8 and adjustably centered by adjusting screws 11 in a manner similar to ring 7 in Figs. 1–3.

Ring 107 may be formed as an annulus, L-shaped in cross-section with the axially extending flange 110 adjustable to concentricity with bearing journals 2.

Ring gear 113, similar outwardly to ring gear 13, may have a web 114 and an inner axially extending flange 115 of larger inner diameter than flange 110 of ring 107. Ring gear 113 may be secured according to the invention in coaxial driving relation with flange 110 by obliquely or tangentially extending bars 120 of identical material characteristic shape and size joined as by welding at opposite ends to flanges 115 and 110, respectively, as at angularly spaced points 124 and 125. The bars 120 will be formed so that the sections between flanges 115 and 110 will normally be substantially straight and have an axial width greater than their thickness. Material will be chosen so that expansion, for example, of ring 107 relative to ring gear 113 will cause equal bending of bars 120 without transmitting any force of dangerously high degree to ring gear 113. The ring gear 113 will therefore remain in coaxial driving relation to ring 107 and substantial freedom of relative expansion and contraction of ring gear 113 and ring 107 will be provided. The radial forces transmittable will be limited by the low resistance to bending in the plane of the gear of the bars 120 to a degree well within the strength of gear 113. A slight relative angular motion of gear 113 and ring 107 will occur upon relative expansion or contraction thereof without destroying their coaxial driving relationship.

Obviously bars 120 may be secured to ring gear 113 and ring 107 by any other suitable known means (not shown) which will permit the relationship hereinabove disclosed to be maintained.

While specific embodiments of the invention have been illustrated and described, it will be understood that the invention is intended to include such modifications and equivalents as may readily occur to persons skilled in the art and is limited only by the appended claims.

It is claimed and desired to secure by Letters Patent:

1. In a gear structure, the combination comprising a driven element subject to severe changes in operating temperature, a rigid ring gear, a rigid annular power transmitting member mounted on said driven element in driving relation, means for adjusting the position of said annular member relative to said driven element to set it in a position concentric with the axis of rotation of said element and yieldable means connecting said ring gear and said annular member in coaxial driving relation, said yieldable means being constructed and arranged to provide for substantially free thermal expansion and contraction of said driven element and said annular member relative to said ring gear.

2. In a drum drive, a gear mounting flange mounted in driving relation on said drum, an auxiliary ring adjustably mounted in driving relation with said flange, centering means for adjusting said ring relative to said flange to center said ring with relation to the true axis of rotation of said drum, a rigid circular ring gear, and yieldable means connecting said ring gear to said auxiliary ring in coaxial driving relation, said yieldable means being constructed and arranged to yield at safe stresses and maintain concentricity of said ring gear and auxiliary ring during relative thermal expansion and contraction thereof.

3. In a drum drive, a gear mounting flange, an annular driving ring adjustably mounted in driving relation to said flange, centering means for adjusting said ring relative to said flange to center said ring with relation to the true rotational axis of said drum, a ring gear and means connecting said ring gear and said driving ring in coaxial driving relation, said means being radially deformable to permit relative thermal expanding and contracting motion of said ring gear and said driving ring without disturbing their concentricity and without causing any appreciable mechanical stress in said ring gear.

4. In an adjustable mounting for ring gears, a rotatable element, a driving ring member mounted on said element in driving relation, centering means for adjusting said ring relative to said rotatable element to center said ring with relation to the axis of rotation of said rotatable element, a circular ring gear member, yieldable means connecting said ring gear member and said driving ring member in coaxial driving relation, comprising at least three radial slots in at least one of said coaxial members substantially equiangularly spaced about its periphery, and a corresponding number of projections on the other of said members arranged in a circle concentric therewith and each having a maximum tangential dimension equal to the width of the slots in the first said member, said projections being engaged in said slots to maintain said members in coaxial driving relation, and provide for substantially free, relative thermal expansion of said members.

5. A gear having a rigid annular member mounted for rotation on its axis, a rigid ring gear member, and means securing said annular member and said ring gear member in coaxial driving relation, said means comprising at least three substantially equiangularly spaced radial slots in one of said members and a corresponding number of projections on the other of said members arranged in a circle concentric therewith, each said lug having a maximum tangential dimension equal to the width of its corresponding slot and being engaged therein to maintain said members in coaxial driving relation and provide for substantial freedom of relative thermal expansion of said members.

6. A gear comprising a rigid annular member mounted for rotation on its axis, a rigid ring gear member, and means for securing said annular member and said ring gear member in coaxial driving relation, said means comprising at least three substantially equiangularly spaced arms of identical material characteristics, shape and size, each secured at one end to said annular member and at the other end to said ring gear member at a point angularly removed from said first end, said arms being sufficiently flexible in the plane of said gear to provide for substantially free relative thermal expansion of said annular member and said ring gear member.

7. In an adjustable mounting for ring gears, a rotatable element, a driving ring member mounted on said element in driving relation, centering means for adjusting said ring relative to said element to center said ring with relation to the axis of rotation of said element, a rigid ring gear member, yieldable means connecting said ring gear member and said driving ring member in coaxial driving relation comprising at least three substantially straight equiangularly spaced arms of substantially identical material characteristics, shape and size, each arm secured at one end to said annular member and at the other end to said ring gear member at a point angularly removed from said first end, said arms being sufficiently flexible in the plane of said gear to provide for substantially free relative thermal expansion of said annular member and said ring gear member.

WILLIAM C. JOHNSON.